UNITED STATES PATENT OFFICE.

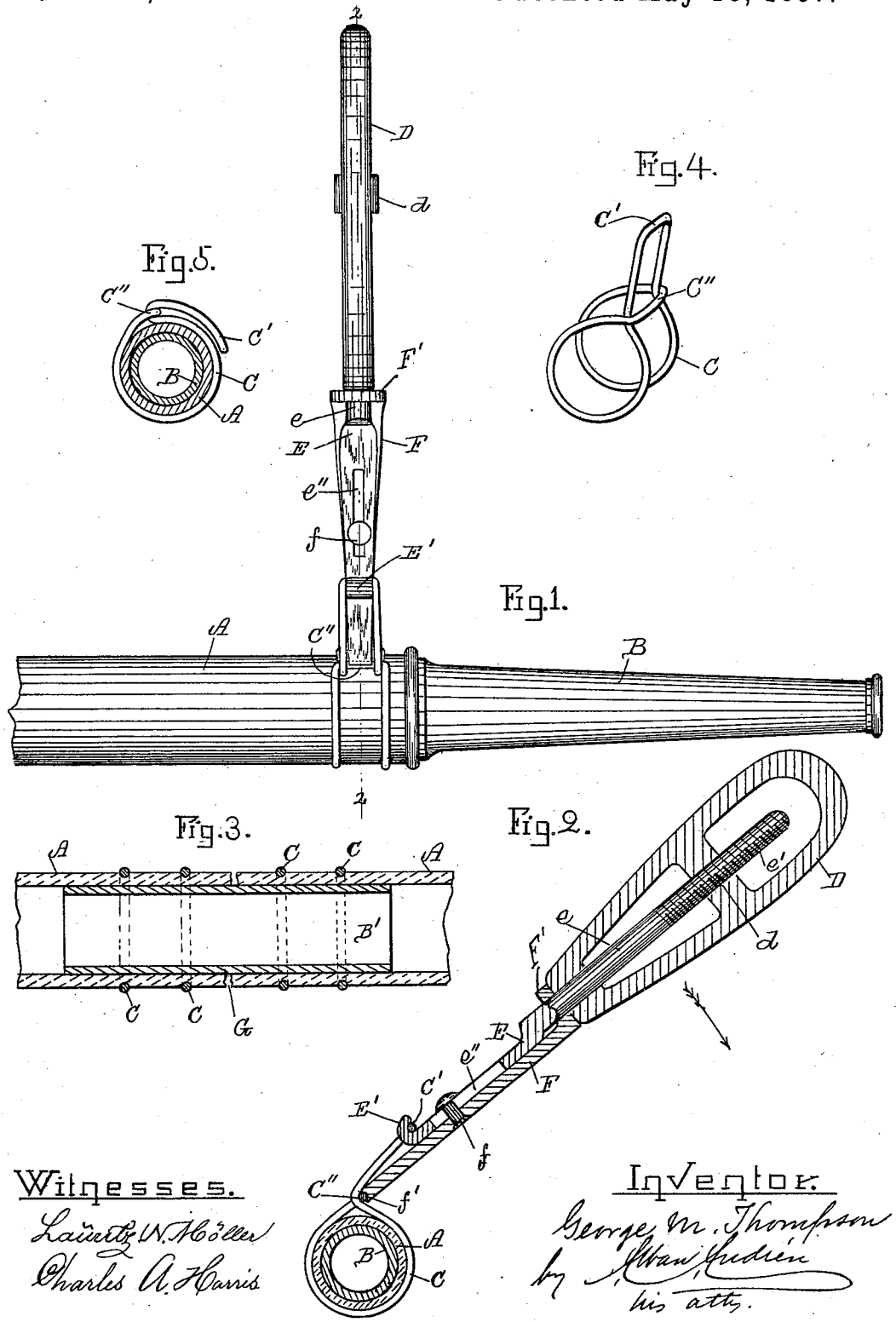

GEORGE M. THOMPSON, OF LOWELL, MASSACHUSETTS, ASSIGNOR, BY DIRECT AND MESNE ASSIGNMENTS, TO CHARLES M. FOWLER AND GEORGE S. PERKINS, OF WORCESTER, MASSACHUSETTS.

HOSE-CONNECTING TOOL.

SPECIFICATION forming part of Letters Patent No. 582,965, dated May 18, 1897.

Application filed December 14, 1896. Serial No. 615,567. (No model.)

*To all whom it may concern:*

Be it known that I, GEORGE M. THOMPSON, a citizen of the United States, and a resident of Lowell, in the county of Middlesex and State of Massachusetts, have invented new and useful Improvements in Hose-Connecting Tools, of which the following, taken in connection with the accompanying drawings, is a specification.

This invention relates to improvements in hose-connecting or hose-mending tools for the purpose of attaching a fire-hose or garden-hose, &c., to a nozzle or coupling or for the purpose of attaching the abutting ends of broken portions of hose together in a quick and efficient manner, as will hereinafter be more fully shown and described, reference being had to the accompanying drawings, wherein—

Figure 1 represents a top plan view of the improved tool shown in position for use in connecting a hose end to a nozzle, &c. Fig. 2 represents a longitudinal section on the line 2 2, shown in Fig. 1. Fig. 3 represents a longitudinal section of a broken hose shown as mended by the use of my improved tool. Fig. 4 represents a perspective view of the wire loop by which the hose is secured to the nozzle or coupling or by means of which the broken ends are mended. Fig. 5 represents a cross-section of the hose, showing it as attached to the nozzle, coupling, or inner tube and showing the encircling wire loop bent over in closed or locked position.

Similar letters refer to similar parts wherever they occur on the different parts of the drawings.

A, in Figs. 1, 2, and 5, represents a hose end that is to be secured around the nozzle, coupling, or tube B by means of my improved tool and wire-loop fastener.

The wire loop C is shown in Fig. 4 in detail, one end C' being put through the other end C'', as shown in the drawings.

The improved tool consists of a handle D, having an end perforated, in which the shank $e$ of the longitudinal adjustable loop-stretcher bar E is guided. Said shank is screw-threaded at its inner end at $e'$ and working in a screw-threaded nut $d$, secured to or forming a part of the handle D, as shown in Fig. 2.

The stretcher-bar E has a hooked end E', adapted, when used, to hook into the outer end C' of the wire loop C, as shown in Figs. 1 and 2.

The hooked stretcher-bar E is guided on a rest-plate F, having an upturned apertured end F', by which it is journaled on shank $e$, as shown in Figs. 1 and 2, and preferably provided with a headed pin, rivet, or projection $f$, going through a slot $e''$ in the adjustable stretcher-bar E, as shown.

The rest-plate F is provided at its outer end with a notch or groove $f'$, adapted to fit on and receive the inner end C'' of the wire loop C during the stretching and closing operation of said wire loop around the hose, as shown in Figs. 1 and 2.

In using the device the hose A is slipped over the nozzle, coupling, or tube, after which the wire loop C is placed around the hose. The notched end $f'$ of the rest-plate F is then placed against the loop portion C'' and the hooked end E of the stretcher-bar E hooked onto the loop portion C', after which the handle D is turned around the screw-threaded shank $e\ e'$, causing the loop C to be drawn tightly around the hose and causing the latter to be closed firmly around the nozzle, coupling, &c., after which the handle D is swung in the direction of arrow shown in Fig. 2, causing the projecting end of the loop to be bent over on the outside of the hose sufficiently to prevent it from slipping, when the handle D is turned around the screw-threaded shank $e\ e'$ in an opposite direction, causing the hook E' to be released from the outer end of the loop C, after which the tool is removed from the loop and the latter hammered down against the outside of the hose, as fully shown in Fig. 5.

For mending leaky or broken hose I slip a short metal tube B' inside the leaky or broken hose or hose parts A' A', as shown in Fig. 3, and attach in a manner, as above described, wire loops C C around the hose on either side of the torn portion or joint G, as shown in Fig. 3.

Having thus fully described the nature, construction, and operation of my invention, I wish to secure by Letters Patent and claim—

1. The herein-described tool, consisting of an internally-screw-threaded handle, a longitudinally-adjustable stretcher-bar having a hook at one end and its opposite end threaded to work in the internal thread of the handle, and a rest-plate slidably connected to the stretcher-bar and having one end arranged to be acted upon by the handle, substantially as described.

2. The herein-described tool, consisting of an internally-screw-threaded handle, a longitudinally-adjustable stretcher-bar having a hook at one end, its opposite end being threaded to work in the thread of the handle, and a slot in the said bar near its hooked end, and a rest-plate having a headed pin projecting from one face thereof through the slot in the stretcher-bar, whereby said plate is slidably connected to the bar, and the opposite end of said plate being arranged to be acted upon by the handle, substantially as described.

3. The herein-described tool, consisting of an internally-screw-threaded handle, a longitudinally-adjustable stretcher-bar having a hook at one end, its opposite end being threaded to work in the thread of the handle, and a slot in the said bar near its hooked end, a rest-plate having one end grooved transversely and its opposite end turned upwardly and apertured to receive the shank of the stretcher-bar, and a headed pin projecting upward from the face of the rest-plate and passing through the slot in the stretcher-bar whereby said plate is slidably connected to the stretcher-bar, substantially as described.

In testimony whereof I have signed my name to this specification, in the presence of two subscribing witnesses, on this 9th day of December, A. D. 1896.

GEORGE M. THOMPSON.

Witnesses:
THOMAS J. ENRIGHT,
FREDERICK LAWTON.